US010013360B2

(12) United States Patent
Mukherjee (10) Patent No.: US 10,013,360 B2
(45) Date of Patent: *Jul. 3, 2018

(54) MANAGING REUSE INFORMATION WITH MULTIPLE TRANSLATION STAGES (71) Applicant: Cavium, Inc., San Jose, CA (US)

(72) Inventor: Shubhendu Sekhar Mukherjee, Southborough, MA (US)

(73) Assignee: Cavium, Inc., San Jose, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 14/638,194

(22) Filed: Mar. 4, 2015

(65) Prior Publication Data

US 2016/0259734 A1    Sep. 8, 2016

(51) Int. Cl.
*G06F 12/10* (2016.01)
*G06F 12/1027* (2016.01)
*G06F 9/455* (2018.01)
*G06F 12/1009* (2016.01)
*G06F 12/0811* (2016.01)

(52) U.S. Cl.
CPC ...... *G06F 12/1027* (2013.01); *G06F 9/45533* (2013.01); *G06F 9/45545* (2013.01); *G06F 9/45558* (2013.01); *G06F 12/0811* (2013.01); *G06F 12/1009* (2013.01); *G06F 2009/45583* (2013.01); *G06F 2212/283* (2013.01); *G06F 2212/657* (2013.01); *G06F 2212/68* (2013.01)

(58) Field of Classification Search
None
See application file for complete search history.

(56) References Cited

U.S. PATENT DOCUMENTS

| 5,737,751 A * | 4/1998 | Patel ............... G06F 12/0897 |
| | | 711/122 |
| 6,370,622 B1 | 4/2002 | Chiou et al. |
| 7,010,633 B2 | 3/2006 | Arndt |

(Continued)

OTHER PUBLICATIONS

Azimi et al., "Enhancing Operating System Support for Multicore Processors by Using Hardware Performance Monitoring", Department of Electrical and Computer Engineering, University of Toronto, Canada, pp. 56-65, Apr. 2009.

(Continued)

*Primary Examiner* — Reginald Glenwood Bragdon
*Assistant Examiner* — James J. Thomas
(74) *Attorney, Agent, or Firm* — Occhiuti & Rohlicek LLP (57) ABSTRACT Address translation and caching is managed using a processor that includes at least one CPU configured to run a hypervisor at a first access level and at least one guest operating system at a second access level. The managing includes: at the second access level, translating from virtual addresses to intermediate physical; at the second access level, determining reuse information for ranges of virtual addresses based on estimated reuse of data stored within a virtual address space; at the first access level, translating from the intermediate physical addresses to physical addresses; at the first access level, determining reuse information for ranges of intermediate physical addresses based on estimated reuse of data stored within an intermediate physical address space; and processing reuse information determined at different access levels to store cache lines in selected portions of a first cache.

18 Claims, 4 Drawing Sheets

(56) References Cited

U.S. PATENT DOCUMENTS

| | | |
|---|---|---|
| 7,461,210 B1 | 12/2008 | Wentzlaff et al. |
| 8,838,914 B2 * | 9/2014 | Adams .................. G06F 12/1063 |
| | | 711/141 |
| 9,032,398 B2 | 5/2015 | Ahmad |
| 9,063,866 B1 | 6/2015 | Tati |
| 9,208,103 B2 | 12/2015 | Kessler |
| 2009/0172314 A1 * | 7/2009 | Gabor .................... G06F 9/3808 |
| | | 711/156 |
| 2009/0222816 A1 * | 9/2009 | Mansell ................. G06F 12/145 |
| | | 718/1 |
| 2012/0079254 A1 * | 3/2012 | Williams ............. G06F 11/3648 |
| | | 712/227 |
| 2012/0117299 A1 | 5/2012 | Waldspurger et al. |
| 2013/0275701 A1 * | 10/2013 | Symes .................... G06F 12/145 |
| | | 711/163 |
| 2013/0318523 A1 | 11/2013 | Curtis et al. |
| 2014/0164723 A1 * | 6/2014 | Garthwaite ............. G06F 12/16 |
| | | 711/162 |
| 2014/0304475 A1 | 10/2014 | Ramanujan et al. |
| 2015/0363326 A1 | 12/2015 | Baskakov |
| 2016/0259689 A1 | 9/2016 | Mukherjee |
| 2016/0259732 A1 | 9/2016 | Mukherjee |

OTHER PUBLICATIONS

Kim et al., "Page Coloring Synchronization for Improving Cache Performance in Virtualization Environment", ICCSA, pp. 495-505, 2011.

Soares et al., Reducing the Harmful Effects of Last-Level Cache Polluters with an OS-Level, Software-Only Pollute Buffer, IEEE pp. 258-269, 2008.

Kim et al., "vCache: Providing a Transparent View of the LLC in Virtualized Environments", IEEE Computer Architecture Letters, pp. 1-4, 2013.

* cited by examiner

MANAGING REUSE INFORMATION WITH MULTIPLE TRANSLATION STAGES

BACKGROUND

The invention relates to managing reuse information with multiple translation stages.

Many modern processors support hierarchical cache systems with multiple levels of cache, including one or more levels within the processor or within each core of a multi-core processor, and one or more levels external to the processor or cores, up to a last level cache (LLC) that is accessed just before main memory is accessed. At each level of the hierarchy, the cache stores copies of a subset of data to speed access to that data by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data into entries and evict blocks of data from entries in units of 'cache lines' (also called 'cache blocks'). Each cache line includes a number of 'words' of data, each word consisting of a predetermined number of bytes. Each cache entry includes space for storing the data words of a particular cache line along with bits for a tag (which contains a number of the most significant bits of an address, which are common to the words of that entry) and space for other information (e.g., a valid bit and any flags or error correction code bits). For a set associative cache, before comparing a tag portion of a memory address of desired data, the cache system compares an index portion of the address to determine in which of multiple sets the cache line containing that data may be stored. For an N-way set associative cache, the tag comparison is performed N times (possibly in parallel), once for each of N 'ways' in which the cache line containing the data may be stored. The lowest order bits of an address (also called a 'block offset') are used to select a particular word from a cache line that is found in the cache (i.e., a 'cache hit'). If the cache line is not found in the cache (i.e., a 'cache miss'), then the cache system attempts to retrieve the cache line from a higher level cache, or from the main memory (in the case of the LLC).

One issue that may arise in the operation of a computing system that includes a cache is called 'cache pollution', where cache lines with lower reusability displace cache lines with higher reusability. Reusability refers to the likelihood that data in a particular cache line will be accessed again after being loaded into the cache and before being evicted. One solution for mitigating this cache pollution problem is the use of a 'pollute buffer', which is a portion of the cache used to store cache lines with low reusability, preserving most of the cache for cache lines with high reusability. For example, using 'page coloring' a particular portion of a virtual address can be associated with a particular 'color' such that virtual addresses with different colors are guaranteed not to overlap in the cache (e.g., by limiting each color to one or more sets of a set associative cache). Page coloring has been used to mitigate cache pollution in some virtualization schemes.

SUMMARY

In one aspect, in general, a method for managing address translation and caching includes: retrieving a first memory page from a storage device in response to a page fault issued after an attempt to retrieve data in the first memory page from a physical address space of a main memory of an external memory system; issuing the attempt to retrieve the data in the first memory page in response to a cache miss issued after an attempt to retrieve the data in the first memory page from a first cache line of a first cache of the external memory system; and managing address translation and caching from a processor that includes (1) at least one memory management unit coupled to the external memory system, and (2) at least one central processing unit configured to run a hypervisor at a first access level and at least one guest operating system at a second access level. The managing includes: at the second access level, translating from virtual addresses in a virtual address space to intermediate physical addresses in an intermediate physical address space; at the second access level, determining reuse information for ranges of virtual addresses in the virtual address space based on estimated reuse of data stored within the virtual address space; at the first access level, translating from the intermediate physical addresses to physical addresses in the physical address space of the main memory; at the first access level, determining reuse information for ranges of intermediate physical addresses in the intermediate physical address space based on estimated reuse of data stored within the intermediate physical address space; and processing reuse information determined at different access levels to store cache lines in selected portions of the first cache.

In another aspect, in general, an apparatus includes: a storage device configured to store memory pages including a first memory page retrieved from the storage device in response to a page fault issued after an attempt to retrieve data in the first memory page from a physical address space, where the attempt to retrieve the data in the first memory page from the physical address space is issued in response to a cache miss; an external memory system including: (1) a main memory controller coupled to main memory having the physical address space, and (2) a first cache configured to store a plurality of cache lines and to issue the cache miss after an attempt to retrieve the data in the first memory page from at least one of the cache lines; and a processor that includes (1) at least one memory management unit coupled to the external memory system, and (2) at least one central processing unit configured to run a hypervisor at a first access level and at least one guest operating system at a second access level. The processor is configured to: at the second access level, translate from virtual addresses in a virtual address space to intermediate physical addresses in an intermediate physical address space; at the second access level, determine reuse information for ranges of virtual addresses in the virtual address space based on estimated reuse of data stored within the virtual address space; at the first access level, translate from the intermediate physical addresses to physical addresses in the physical address space of the main memory; at the first access level, determine reuse information for ranges of intermediate physical addresses in the intermediate physical address space based on estimated reuse of data stored within the intermediate physical address space; and process reuse information determined at different access levels to store cache lines in selected portions of the first cache.

Aspects can include one or more of the following features.

Processing reuse information determined at different access levels comprises selecting between first reuse information determined at the first access level and second reuse information determined at the second access level based on content of one or both of the first reuse information and the second reuse information.

Processing reuse information determined at different access levels comprises combining first reuse information determined at the first access level and second reuse information determined at the second access level according to a predetermined function.

Each range of virtual addresses, of the ranges of virtual addresses for which reuse information is determined, consists of virtual addresses having a common virtual page number; and each range of intermediate physical addresses, of the ranges of intermediate physical addresses for which reuse information is determined, consists of intermediate physical addresses having a common intermediate physical page number.

The first access level has a higher privilege than the second access level.

The central processing unit configured to manage security for physical addresses in the physical address space of the main memory at a third security level that has a higher privilege than the first access level.

Processing reuse information determined at different access levels to store cache lines in selected portions of the first cache includes processing reuse information determined at three or more different access levels.

The estimated reuse of data stored within the virtual address apace and the estimated reuse of data stored within the intermediate physical address space comprise estimated miss rates for blocks of data that are attempted to be retrieved from corresponding cache lines of the first cache.

The reuse information for ranges of virtual addresses is stored independently from: (1) any bits used to indicate virtual addresses, and (2) any bits used to indicate intermediate physical addresses.

The reuse information for ranges of intermediate physical addresses is stored independently from: (1) any bits used to indicate intermediate physical addresses, and (2) any bits used to indicate physical addresses.

The first cache comprises a last level cache.

Aspects can have one or more of the following advantages.

By storing explicit reuse information that quantitatively characterizes the reusability of a particular range of memory addresses, one or more levels of address translation can be performed without requiring assignment of special addresses using page coloring or other techniques to mitigate cache pollution. For example, one way to estimate reusability is by measuring past cache misses for a particular portion of an address space (e.g., at the granularity of a memory page, which contains many cache lines).

Storing reuse information in both a guest operating system page table and a hypervisor page table enables the reuse information to be accessible at both access levels. Processing reuse information determined at different access levels to select in which portion (e.g., in which 'way') of a last level cache to store a particular cache line enables flexibility to use various rules for selecting different reuse information under some scenarios, or flexibility to use various functions for combining different reuse information under other scenarios.

Storing reuse information independently from any bits used to indicate any type of address (e.g., virtual addresses, intermediate physical addresses, or physical addresses) enables greater freedom to apply the reuse information for mitigating cache pollution without interfering with address translation schemes, especially in virtualized systems.

Other features and advantages of the invention will become apparent from the following description, and from the claims.

DESCRIPTION

Different kinds of virtualization are often used in a computing system. One kind of virtualization is 'virtual memory', which allows program instructions being executed by the CPU to refer to virtual addresses within a 'virtual address space' that is larger than a 'physical address space' that is defined by the size of main memory. Virtual memory involves address translation from one or more such virtual address spaces into a physical address space. The translation is performed using a 'page table' that stores mappings between virtual addresses and physical addresses at a granularity of memory pages (or simply 'pages') that typically consist of many cache lines.

Other kinds of virtualization involve a 'virtual machines' (VMs). These kinds of virtualization include 'core virtualization', which enables multiple guest operating systems to each run in its own separate VM while sharing the same physical system hardware, and 'I/O virtualization' in which multiple I/O streams are coupled to and come from different VMs. A 'hypervisor' (also called a virtual machine monitor (VMM)) runs on the physical system to manage all of the guest operating systems of a virtualized system. The hypervisor runs at higher-privileged access level than the guest operating systems. So only the hypervisor has access to the physical address space. Therefore, each guest operating system is provided its own 'intermediate physical address space' into which one or more virtual address spaces are translated, and the hypervisor translates intermediate physical addresses into physical addresses. This combination of virtual memory and VM virtualization schemes, described in more detail below, raises a problem for some approaches to mitigating cache pollution.

To understand how virtual memory and these virtualization schemes affect cache management, it is helpful to understand the operation of cache systems. Effective cache performance relies on two properties of the data access patterns: temporal locality, and spatial locality with respect to data that has just been accessed. Temporal locality means that the same data is likely to be accessed again soon. Spatial locality means that data located in nearby addresses is likely to be accessed soon. Unfortunately, certain data sets do not exhibit significant temporal or spatial locality. When a cache line with such data is stored in a cache entry, it replaces another cache line that may have higher temporal and/or spatial locality. Data with higher temporal and/or spatial locality is more reusable than data with lower temporal and/or special locality.

In some cache pollution mitigation schemes, reusability is estimated using cache miss rates. Cache miss rates of virtual addresses are sampled, and then data with virtual addresses that have high miss rates are mapped to a portion of physical address space that is stored in a relatively small region of a cache called a pollute buffer. By restricting high miss rate data to the pollute buffer, the evictions caused by the frequent misses for that data will only affect other data that also has high miss rates, which preserves data with low miss rates in another region of the cache outside of the pollute buffer. One way to map a virtual address to a physical address that is guaranteed to be restricted to a particular region of the cache is to restrict an 'index' portion of the physical address used to select a particular 'set' of a set associative cache. This mechanism works well in a non-virtualized system in which an operation system has direct control of a machine's physical address layout. However, this mechanism may not work as well in a virtualized system where a guest operating system may not have direct control of a host machine's physical address layout. Alternative techniques for providing a pollute buffer for a virtualized system involve reuse information that is independent from the addresses and can be efficiently managed at the multiple access levels of the guest operating systems and the hypervisor.

Figure 1:
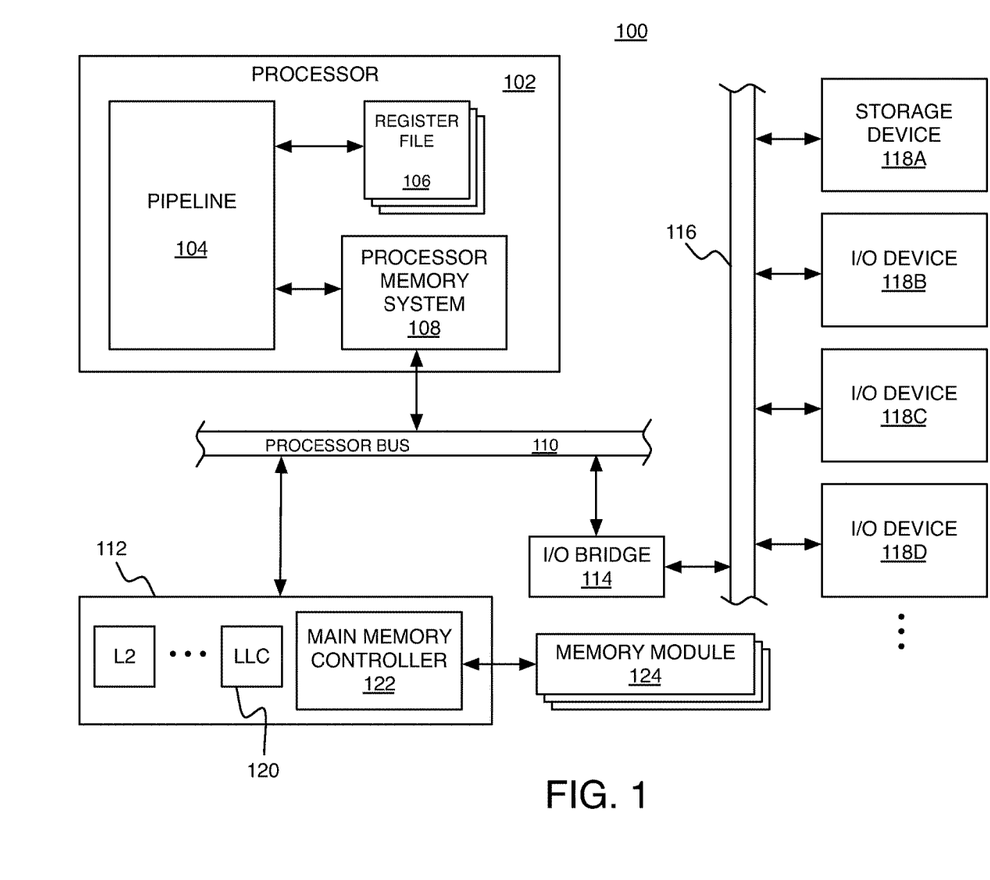
FIG. 1 is a schematic diagram of a computing system.

FIG. 1 shows an example of a computing system 100 in which pollute buffer management techniques can be used. The system 100 includes at least one processor 102, which could be a single central processing unit (CPU) or an arrangement of multiple processor cores of a multi-core architecture. In this example, the processor 102 includes a pipeline 104, one or more register files 106, and a processor memory system 108. The processor 102 is connected to a processor bus 110, which enables communication with an external memory system 112 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory, as described in more detail below.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L2 cache if there are only two levels in the hierarchy) is the LLC 120, which is accessed just before main memory. Of course, this is only an example. The exact division between which level caches are within the processor memory system 108 and which are in the external memory system 112 can be different in other examples. For example, the L1 cache and the L2 cache could both be internal to the processor 102, and the L3 (and higher) caches could be external to the processor 102. If the processor 102 is a multi-core processor, each core could have its own internal L1 cache, and the cores could share an L2 cache. The external memory system 112 also includes a main memory controller 122, which is connected to any number of memory modules 124 serving as main memory (e.g., Dynamic Random Access Memory modules).

Figure 2:
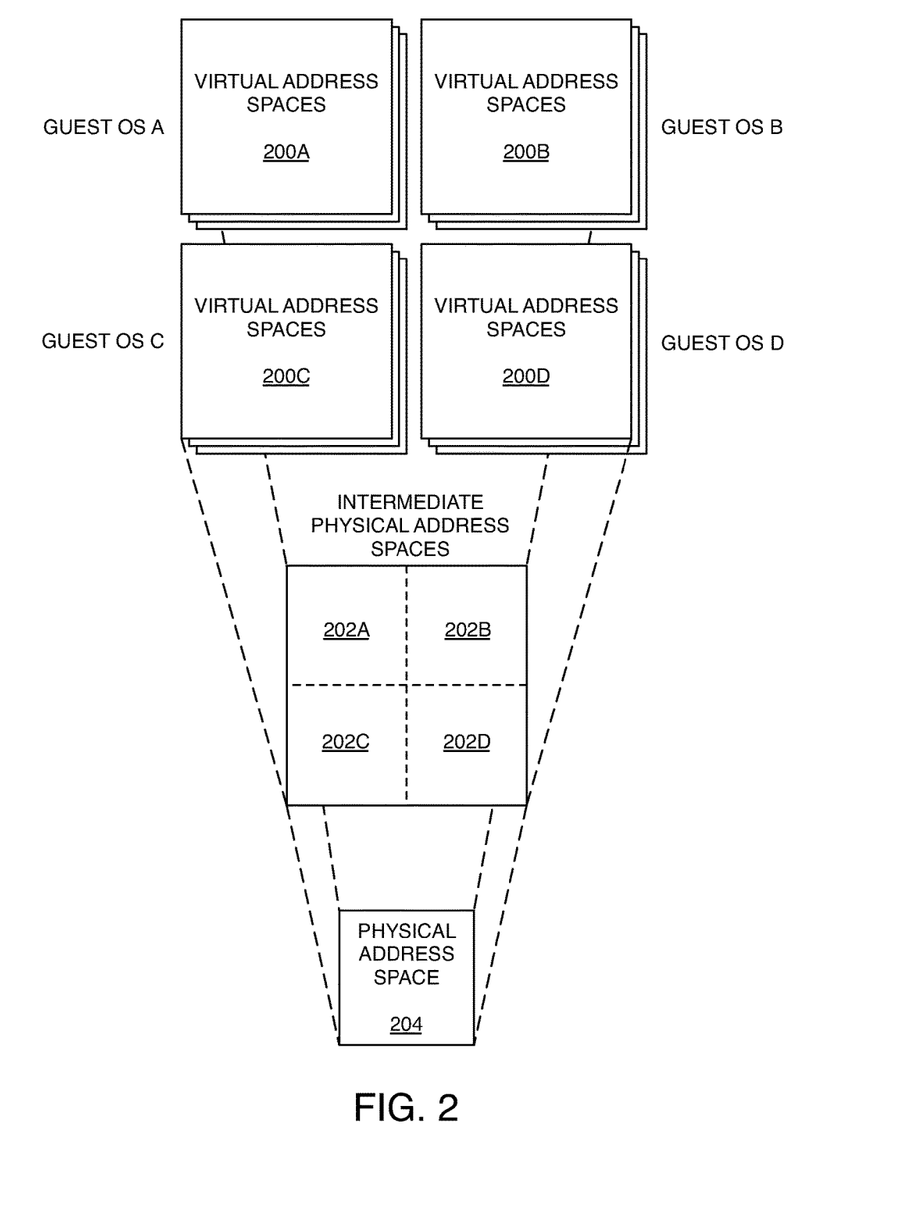
FIG. 2 is a schematic diagram illustrating different levels of address spaces.

FIG. 2 illustrates an relationships among different address spaces in an example of a virtualized system with virtual memory. As described above, there are three types of addresses: virtual address (VA), intermediate physical address (IPA), and physical address (PA). One or more guest operating systems (OSs) run within the hypervisor, which runs directly on the host such as computing system 100. In this example, there are four guest OSs: guest OS A, guest OS B, guest OS C, and guest OSD. Each guest OS provides one or more virtual address spaces for programs running in that guest OS, and manages translation of VAs within those virtual address spaces to IPAs within an intermediate physical address space. In this example, guest OS A provides virtual address spaces 200A, and manages translations to intermediate physical address space 202A; guest OS B provides virtual address spaces 200B, and manages translations to intermediate physical address space 202B; guest OS C provides virtual address spaces 200C, and manages translations to intermediate physical address space 202C; and guest OS D provides virtual address spaces 200D, and manages translations to intermediate physical address space 202D. The hypervisor running underneath each guest operating system manages translation of IPAs within all of the intermediate physical address spaces to PAs within the physical address space 204 corresponding to the actual physical storage locations within main memory. Portions of the PA are used as tags, indexes, and offsets to access data in a cache in the cache system, such as the LLC 120. For cache pollution mitigation techniques in which a guest OS uses the VA-to-IPA translation to restrict high miss rate data to a 'software pollute buffer' based on a portion of the IPA, there would need to be a mechanism for the hypervisor to determine that the software pollute buffer is mapped to specific IPA regions for any software optimizations performed by the guest OS to be useful for optimizing a hardware pollute buffer based on a portion of the PA. As an alternative to using a portion of the addresses to map certain data to a pollute buffer, the page tables used to store mappings can be augmented with explicit reuse information that encodes a quantitative estimate of the reusability of particular pages, which is then used to efficiently divert cache lines on certain pages to a selected portion of the cache serving as a pollute buffer.

Figure 3A:
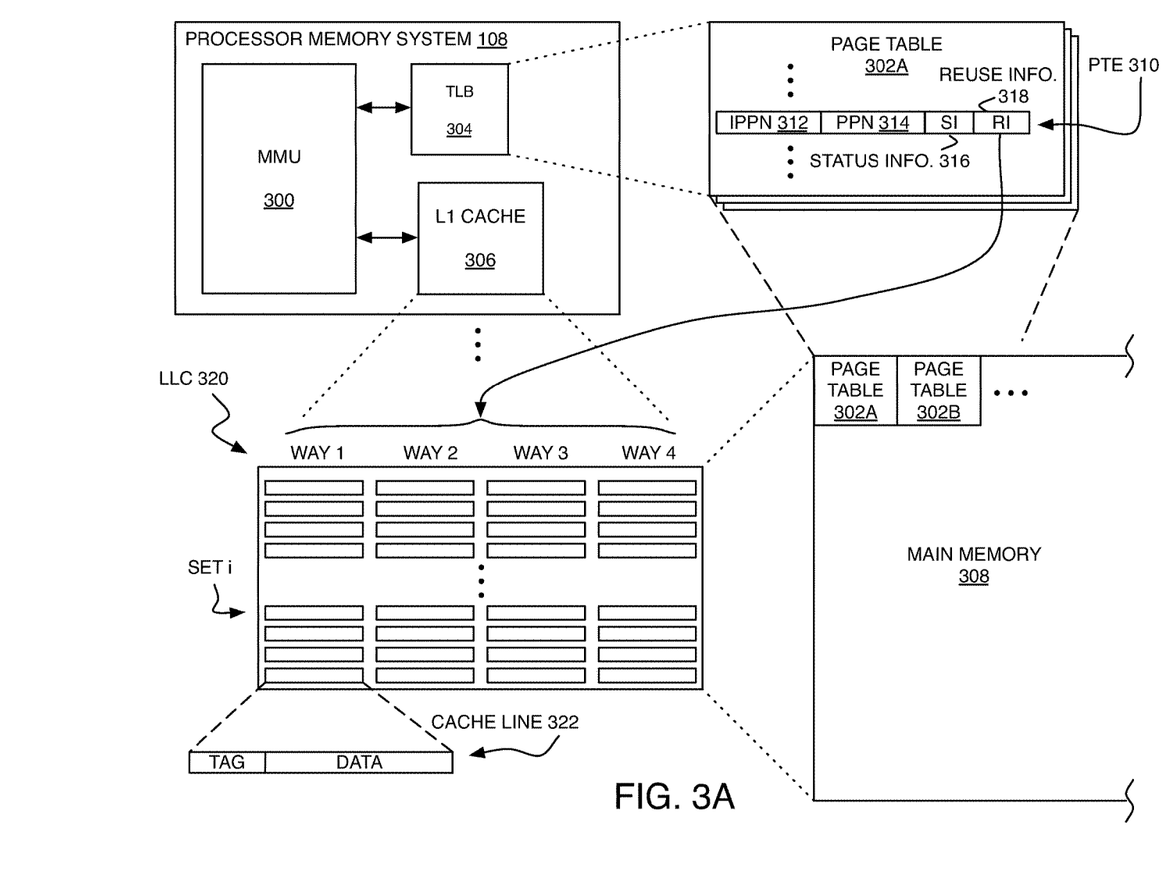
FIGS. 3A and 3B are schematic diagrams illustrating a procedure for managing reuse information.
Figure 3B:
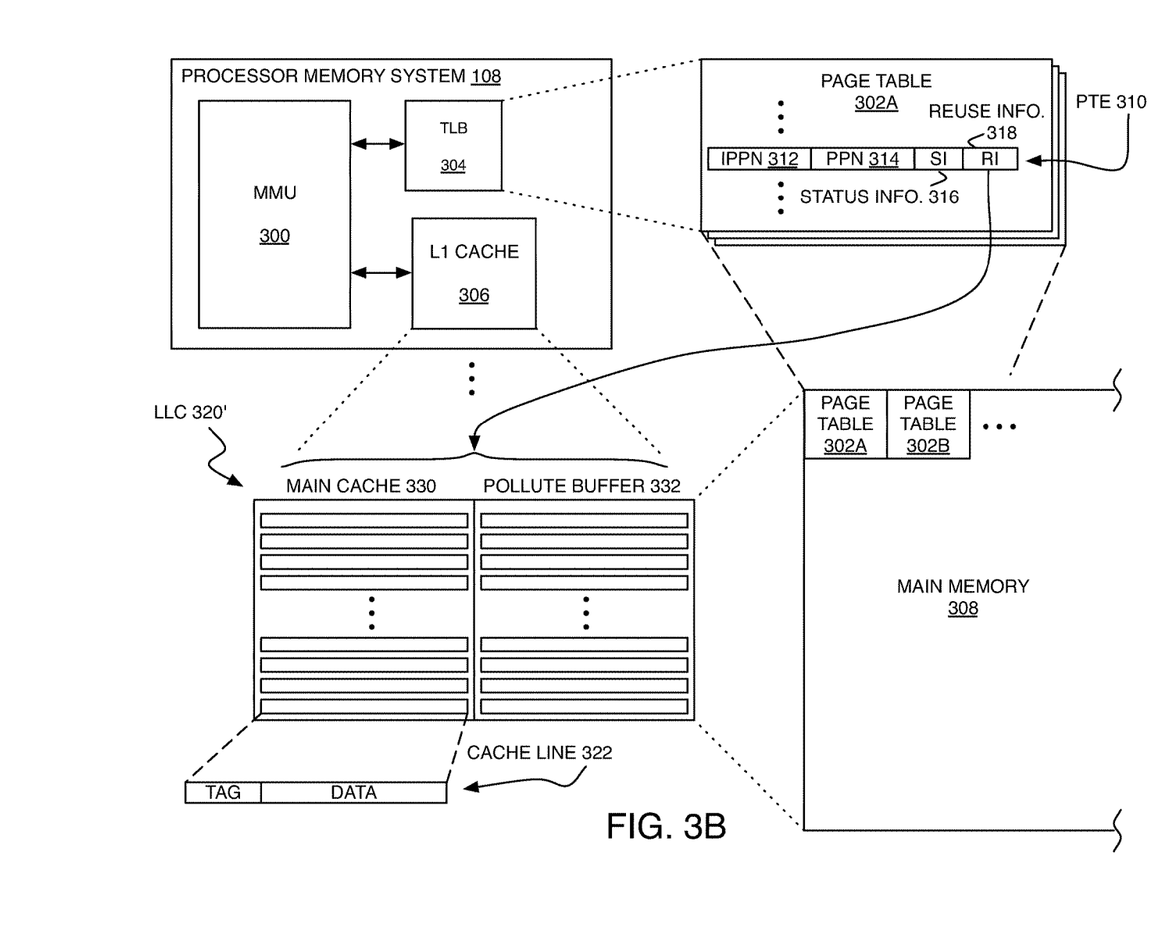

FIGS. 3A and 3B illustrate examples of a procedure for managing and applying such reuse information. The processor memory system 108 includes a memory management unit (MMU) 300 that the hypervisor uses for translation of IPAs to PAs. In a virtualized system the translation by the guest OSs of VAs to IPAs may be handled entirely in software, or the guest OSs may have some hardware assistance from the MMU 300. In either case, there will be page tables for use by the guest OSs with entries that store VA-to-IPA mappings, and a separate page table for use by the hypervisor with entries that store IPA-to-PA mappings. A page table 302A is an example of such a page table for use by the hypervisor for translating IPAs, which is typically stored in main memory 308 along with a number of additional page tables including a page table 302B, which may be used by a guest OS for translating VAs.

The processor memory system 108 also includes a translation lookaside buffer (TLB) 304 for caching frequently used page table entries from one or more page tables. This enables the translation to be performed without necessarily having to access main memory to retrieve a page table entry. The processor memory system 108 also includes an L1 cache 306, and various other circuitry for handling a miss in either the TLB 304 or the L1 cache. When a load or store instruction is executed, the TLB 304 is used to translate a memory address of that instruction (from a VA to an IPA to a PA), and to determine whether a copy of the data from that memory address is in any of the levels of the hierarchical cache system, from the L1 cache 306 up to an LLC 320 if necessary. If so, that instruction can be executed from the cache system. If not, that instruction can be handled by miss circuitry so that it may be executed after accessing main memory 308 directly.

In this example, a page table entry (PTE) 310 of the page table 302A stores an intermediate physical page number 312 and a physical page number 314, which serve as a mapping between an IPA and a PA. Because the low order bits comprising the page offsets are identical for an IPA and its mapped PA, that leaves only the high order bits comprising the page numbers to specify the mapping. Likewise, a PTE of the page table 302B stores a virtual page number and an intermediate physical page number, which serves as a mapping between a VA and an IPA. The PTE 310 also includes status information 316, such as information indicating whether or not the page is resident in main memory 308 or needs to be retrieved from secondary storage (e.g., storage device 118A). When the PTE 310 is stored in the TLB 304, there may also be additional information for managing the transfer of PTEs between a full page table and the TLB 304.

An additional field 318 in the PTE 310 is provided for storing reuse information. The reuse information provides a mechanism that allows a guest OS to convey to the underlying cache system, at any level between the L1 cache 306 and the LLC 320, a quantitative estimate of the reusability of the data stored on a particular page. In some implementations, the reuse information is binary and can therefore be encoded using a single 'reuse bit' (e.g., 0=low reusability, or 1=high reusability). In the binary case, a threshold can be selected to differentiate between low and high reusability. If the average miss rate for cache lines within a particular page is above the threshold, then the reuse bit is set to 0 (i.e., high miss rate=low reusability). If the average miss rate for cache lines within a particular page is below the threshold, then the reuse bit is set to 1 (i.e., low miss rate=high reusability). If additional bits are used to encode the reuse information, a more fine-grained quantitative estimate can be encoded (e.g., 2 bits provides 4 reuse levels determined using 3 thresholds).

In some implementations, each guest OS is responsible for maintaining reuse information for pages in a VA-to-IPA page table, and the hypervisor is responsible for maintaining reuse information for pages in a IPA-to-PA page table. For both types of page tables, the reuse information would be copied along with an entire PTE when that PTE cached in the TLB 304. For any level cache in the cache system that is configured with a pollute buffer based on reuse information, the cache system uses the reuse information for a particular page from one or both page tables to select a portion of that cache for accessing a cache line 322 that falls within that particular page. FIGS. 3A and 3B illustrate examples in which the LLC 320 is configured with a pollute buffer. The page that contains a particular cache line can be determined by using the appropriate portion of the tag and index for that cache line that corresponds to the address bits used for the page number.

The guest OS and the hypervisor could potentially estimate different quantitative values for the reuse information for the same page. The cache system can be configured to process the reuse information from both translation stages (i.e., from both page tables) in any of a variety of ways. For example, the cache system can use a rule for selecting between the guest OS reuse information and the hypervisor reuse information. One such rule for binary reuse information could be: if the guest OS indicates 'low reusability' and the hypervisor indicates 'high reusability', then select low reusability' as the reuse information. Alternatively, the cache system can use a predetermined function to combine the reuse information from both translation stages, potentially resulting in a more fine-grained estimate as the combined reuse information. Whether it is one of the values of reuse information from either translation stage that is selected based on a rule, or it is a predetermined function used to combine the reuse information and derive resulting reuse information that may be different from that of either stage, the processing can be implemented by storing a mapping between the possible values for both stages and the corresponding result. The cache system can also determine to override the table and use reuse information from any of the translation stages or access levels, or to turn off the pollute buffer and ignore the reuse information based on certain attributes of the software and/or hardware. The following table is an example of a mapping table for a system with two stages and binary reuse information.

| Reuse Information Mapping Table | | |
| --- | --- | --- |
| Guest OS stage | Hypervisor stage | Resulting reuse information |
| low reusability | low reusability | low reusability |
| low reusability | high reusability | low reusability |
| high reusability | low reusability | low reusability |
| high reusability | high reusability | high reusability |

In some processor architectures, there are additional access levels beyond those for the guest OS and the hypervisor. For example, there may be a lowest-privileged access level L0 for user programs running in a guest OS, an access level L1 for a guest OS, an access level L2 for a hypervisor, and a highest privileged access level L3 for a security system managing secure and non-secure pages within main memory. Some implementations may enable each access level to maintain its own reuse information for pages, and the cache system can process reuse information from any combination of levels to determine the ultimate reuse information used to access the LLC 320.

There are a variety of techniques for storing cache lines in selected portions of a cache in order to provide a pollute buffer. In the example of FIG. 3A, the LLC 320 is a 4-way set associative cache. The cache system can use one of the ways (e.g., WAY 4) as a pollute buffer for cache lines on pages with 'low reusability', and can use the other ways (WAYS 1-3) as the main cache for cache lines on pages with 'high reusability'. In the example of FIG. 3B, the LLC 320' is a physically split cache with separate dedicated main cache 330 and pollute buffer 332. The cache system still uses the reuse information from one or both translation stages to select between the main cache 330 and pollute buffer 332.

Other embodiments are within the scope of the following claims.

What is claimed is:

1. A method for managing address translation and caching, the method comprising:

retrieving a first memory page from a storage device in response to a page fault issued after an attempt to retrieve data in the first memory page from a physical address space of a main memory of an external memory system;

issuing the attempt to retrieve the data in the first memory page in response to a cache miss issued after an attempt to retrieve the data in the first memory page from a first cache line of a first cache of the external memory system; and managing address translation and caching from a processor that includes (1) at least one memory management unit coupled to the external memory system, and (2) at least one central processing unit configured to run a hypervisor at a first access level and at least one guest operating system at a second access level, the managing including:
   at the second access level, translating from virtual addresses in a virtual address space to intermediate physical addresses in an intermediate physical address space;
   at the second access level, determining reuse information for ranges of virtual addresses in the virtual address space based on estimated reuse of data stored within the virtual address space;
   at the first access level, translating from the intermediate physical addresses to physical addresses in the physical address space of the main memory;
   at the first access level, determining reuse information for ranges of intermediate physical addresses in the intermediate physical address space based on estimated reuse of data stored within the intermediate physical address space; and
   processing reuse information determined at different access levels to store cache lines in selected portions of the first cache;
   wherein processing reuse information determined at different access levels comprises at least one of: (1) selecting between first reuse information determined at the first access level and second reuse information determined at the second access level based on content of one or both of the first reuse information and the second reuse information, or (2) combining first reuse information determined at the first access level and second reuse information determined at the second access level according to a predetermined function.

2. The method of claim 1, wherein each range of virtual addresses, of the ranges of virtual addresses for which reuse information is determined, consists of virtual addresses having a common virtual page number; and each range of intermediate physical addresses, of the ranges of intermediate physical addresses for which reuse information is determined, consists of intermediate physical addresses having a common intermediate physical page number.

3. The method of claim 1, wherein the first access level has a higher privilege than the second access level.

4. The method of claim 3, wherein the central processing unit manages security for physical addresses in the physical address space of the main memory at a third security level that has a higher privilege than the first access level.

5. The method of claim 4, wherein processing reuse information determined at different access levels to store cache lines in selected portions of the first cache includes processing reuse information determined at three or more different access levels.

6. The method of claim 1, wherein the estimated reuse of data stored within the virtual address space and the estimated reuse of data stored within the intermediate physical address space comprise estimated miss rates for blocks of data that are attempted to be retrieved from corresponding cache lines of the first cache.

7. The method of claim 1, wherein the reuse information for ranges of virtual addresses is stored independently from: (1) any bits used to indicate virtual addresses, and (2) any bits used to indicate intermediate physical addresses.

8. The method of claim 1, wherein the reuse information for ranges of intermediate physical addresses is stored independently from: (1) any bits used to indicate intermediate physical addresses, and (2) any bits used to indicate physical addresses.

9. The method of claim 1, wherein the first cache comprises a last level cache.

10. An apparatus comprising:
   a storage device configured to store memory pages including a first memory page retrieved from the storage device in response to a page fault issued after an attempt to retrieve data in the first memory page from a physical address space, where the attempt to retrieve the data in the first memory page from the physical address space is issued in response to a cache miss;
   an external memory system including: (1) a main memory controller coupled to main memory having the physical address space, and (2) a first cache configured to store a plurality of cache lines and to issue the cache miss after an attempt to retrieve the data in the first memory page from at least one of the cache lines; and
   a processor that includes (1) at least one memory management unit coupled to the external memory system, and (2) at least one central processing unit configured to run a hypervisor at a first access level and at least one guest operating system at a second access level;
   wherein the processor is configured to:
      at the second access level, translate from virtual addresses in a virtual address space to intermediate physical addresses in an intermediate physical address space;
      at the second access level, determine reuse information for ranges of virtual addresses in the virtual address space based on estimated reuse of data stored within the virtual address space;
      at the first access level, translate from the intermediate physical addresses to physical addresses in the physical address space of the main memory;
      at the first access level, determine reuse information for ranges of intermediate physical addresses in the intermediate physical address space based on estimated reuse of data stored within the intermediate physical address space; and
      process reuse information determined at different access levels to store cache lines in selected portions of the first cache;
      wherein processing reuse information determined at different access levels comprises at least one of: (1) selecting between first reuse information determined at the first access level and second reuse information determined at the second access level based on content of one or both of the first reuse information and the second reuse information, or (2) combining first reuse information determined at the first access level and second reuse information determined at the second access level according to a predetermined function.

11. The apparatus of claim 10, wherein each range of virtual addresses, of the ranges of virtual addresses for which reuse information is determined, consists of virtual addresses having a common virtual page number; and each range of intermediate physical addresses, of the ranges of intermediate physical addresses for which reuse information is determined, consists of intermediate physical addresses having a common intermediate physical page number.

12. The apparatus of claim 10, wherein the first access level has a higher privilege than the second access level.

13. The apparatus of claim 12, wherein the central processing unit is configured to manage security for physical addresses in the physical address space of the main memory at a third security level that has a higher privilege than the first access level.

14. The apparatus of claim 13, wherein processing reuse information determined at different access levels to store cache lines in selected portions of the first cache includes processing reuse information determined at three or more different access levels.

15. The apparatus of claim 10, wherein the estimated reuse of data stored within the virtual address space and the estimated reuse of data stored within the intermediate physical address space comprise estimated miss rates for blocks of data that are attempted to be retrieved from corresponding cache lines of the first cache.

16. The apparatus of claim 10, wherein the reuse information for ranges of virtual addresses is stored independently from: (1) any bits used to indicate virtual addresses, and (2) any bits used to indicate intermediate physical addresses.

17. The apparatus of claim 10, wherein the reuse information for ranges of intermediate physical addresses is stored independently from: (1) any bits used to indicate intermediate physical addresses, and (2) any bits used to indicate physical addresses.

18. The apparatus of claim 10, wherein the first cache comprises a last level cache.

* * * * *